United States Patent [19]

Swanson et al.

[11] Patent Number: 4,852,296

[45] Date of Patent: Aug. 1, 1989

[54] DEVICE FOR ATTRACTING AND ELECTROCUTING FLYING INSECTS

[76] Inventors: Ernest B. Swanson, S. 3701 Loretta; It S. Chane, 10716 E. 29th Ave., both of Spokane, Wash. 99206

[21] Appl. No.: 281,460

[22] Filed: Dec. 8, 1988

[51] Int. Cl.$^4$ .............................................. A01M 1/22
[52] U.S. Cl. ...................................................... 43/112
[58] Field of Search ......................................... 43/112

[56] References Cited

U.S. PATENT DOCUMENTS

| | | | |
|---|---|---|---|
| Re. 18,294 | 12/1931 | Frost | 43/112 |
| 4,121,371 | 10/1978 | Kaphengst et al. | 43/112 |
| 4,454,677 | 6/1984 | Chuang | 43/112 |
| 4,523,404 | 6/1985 | Deyoreo | 43/112 |

Primary Examiner—M. Jordan
Attorney, Agent, or Firm—Keith S. Bergman

[57] ABSTRACT

A device to attract flying insects and cause their demise by electrocution provides two spaced cylindrical grids that are oppositely charged electrically in such fashion and so spaced that an insect coming in contact therewith or passing therebetween causes an electric discharge between the grids that kills the insect. The device provides a light to aid in attracting insects primarily during hours of darkness and an openable container for olfactory attractants such as food stuffs and pheromones. The attractant container, if opened during use of the device, deactivates the electrical circuitry to avoid operator injury.

4 Claims, 2 Drawing Sheets

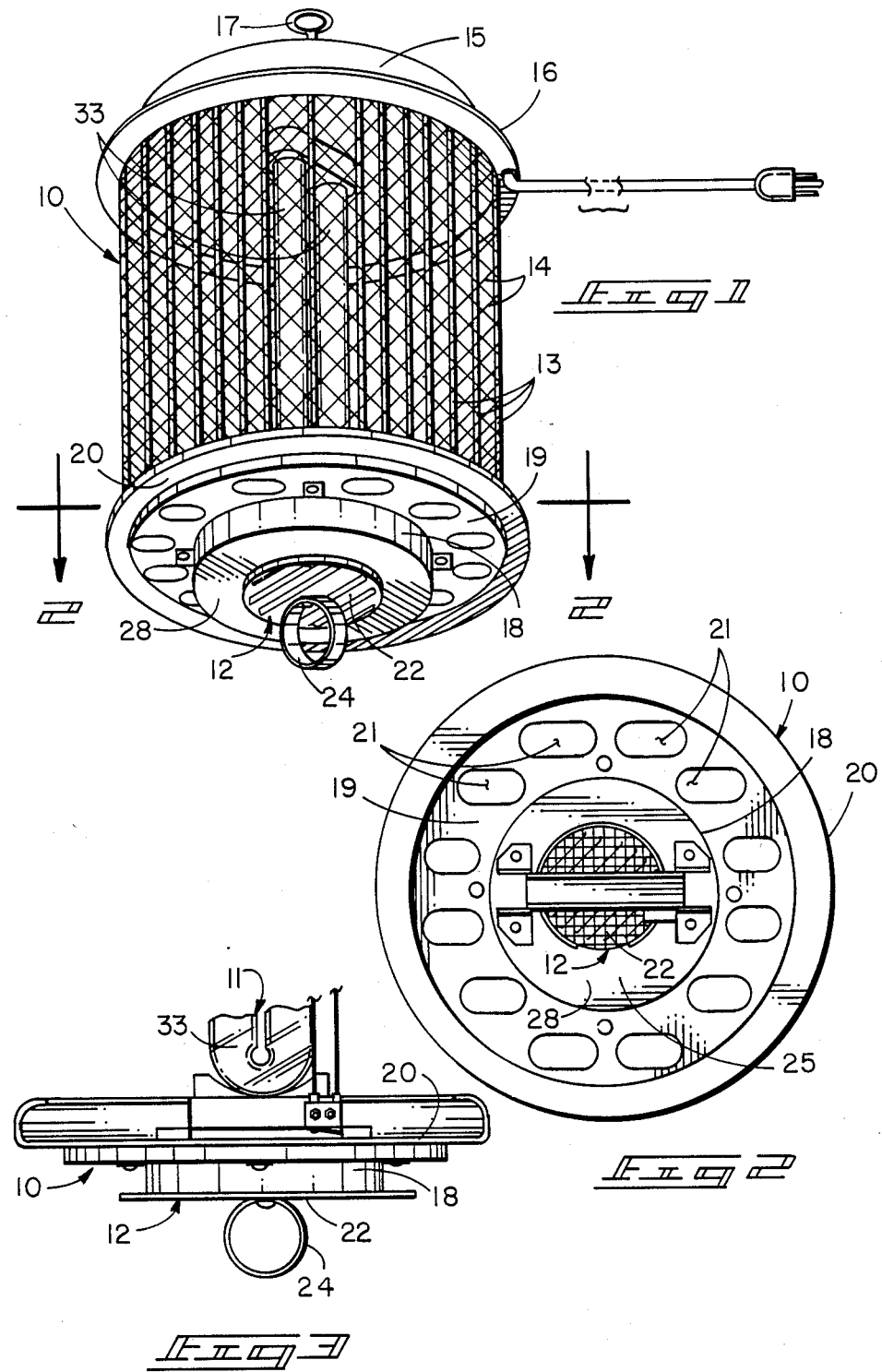

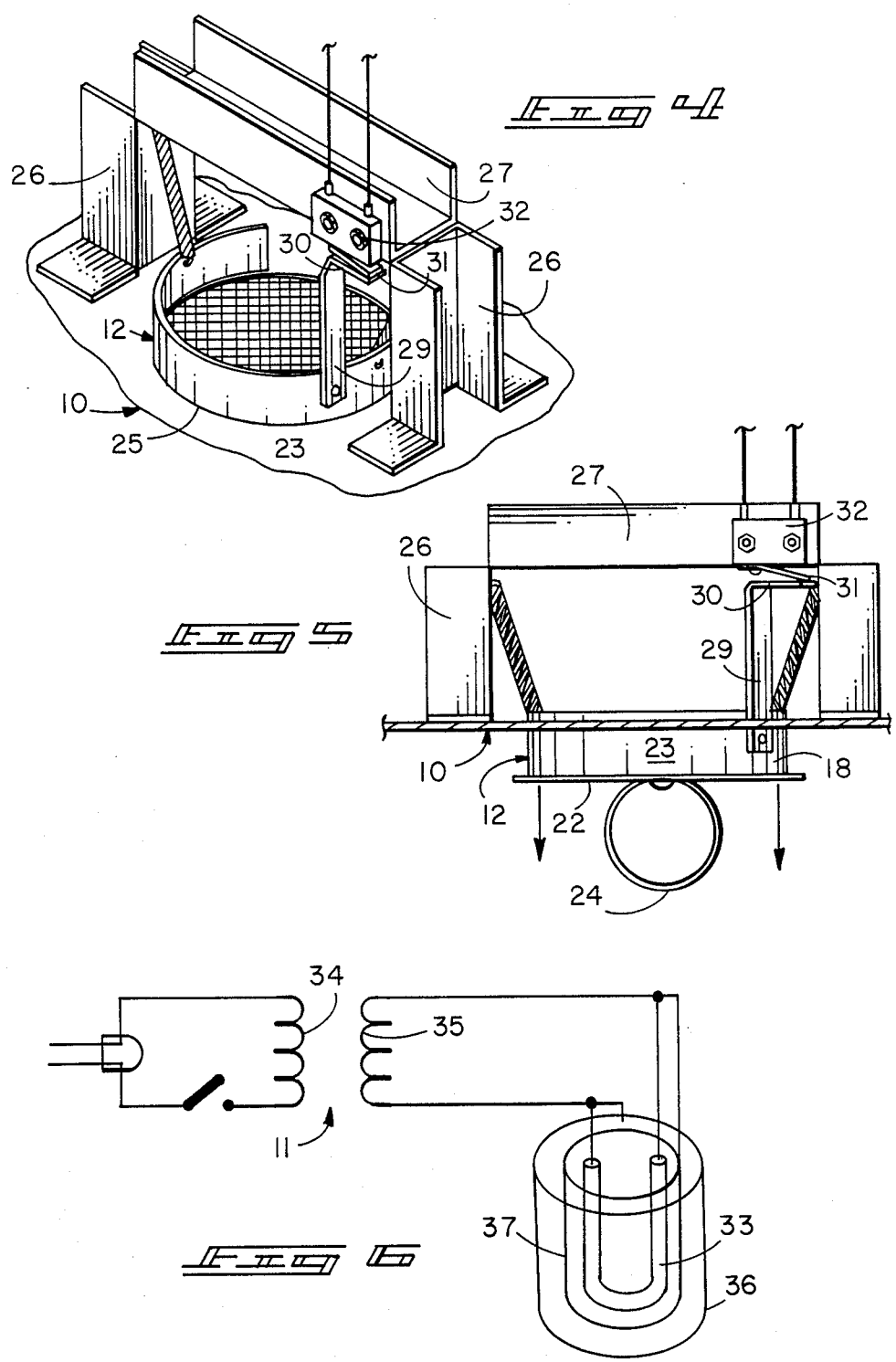

DEVICE FOR ATTRACTING AND ELECTROCUTING FLYING INSECTS

BACKGROUND OF INVENTION

RELATED APPLICATIONS

There are no applications related hereto heretofore filed in this or any foreign country.

1. Field of Invention

Our invention generally relates to devices for attracting and electrocuting flying insects and more particularly to use of and a container for olfactory attractants in such devices.

2. Background and Description of Prior Art

The riddance of human environments of flying insects is an ancient problem existent undoubtedly as long as both the insects and humans have occupied the same environ. Many and various solutions have been proposed and heretofore become known for such purposes, but none seem to have completely and satisfactorily resolved the problem.

With the advent of environmental concerns in the modern culture, processes for destruction or riddance of insect pests have changed and been modified to present more environmentally compatible solutions which generally have substantially done away with the common use of chemical insecticides. Responsively in the present day, most devices for insect destruction or control fall into a first class of entrapment-type structures that attract insects into a containment space in which the insects are killed or otherwise contained for subsequent disposition and a second class of destruction type devices that attract insects and directly kill them without any necessary containment. Principal amongst this latter type of device is an electronic structure providing spaced, electrically charged grids that upon breaking the dielectric space between them discharge an electric current sufficient to electrocute the insect upon its encroachment. Such devices have become popular as they generally do not pollute the surrounding environment with any deleterious substances and they tend to maintain insects bodies in a reasonably small area in or in the vicinity of the device. Our invention adds a new, novel and improved member to this class of insect destroying device.

Prior art electrocution-type insect control devices have generally taken the form of a peripheral protective structure defining multiple orifices, generally in vertical side walls, enclosing two spacedly related electrical grids surrounding a medial light source. Insects are attracted to the device by the light source and may generally freely pass by flying or crawling through the surrounding protective structure and charged grid structures. Since these devices use only a light source as an optical attractant, they are effeciently destructive of insects only when they are optically active to an insect's senses, and the effectiveness of this optical attraction varies generally with surrounding ambient light conditions. The highest efficiency obviously occurs when the ambient environment is dark and efficiency becomes less as light intensity surrounding the structure increases, until in full sunlight during daytime hours light attractants are practically useless, especially at a distance. It further appears that not all insects are attracted with equal intensity by particular optical attractants and some, in fact, may not even be attracted at all by lights.

These problems with optical attractants in insect electrocution devices have been recognized, but other types of attractants generally have come into use in such devices in conjunction with a light-type optical attractant. Olfactory attractants of one sort or another, commonly including odoriferous food stuffs or substances simulating the odors of such food stuffs and pheromones of various sorts, both either generically selected to be attractive to large classes of insects or specific to particular genera or species have become known in various entrapment devices, but generally not in electrocution devices. Our invention provides an odoriferous attractant and structure for its use for such electrocution type devices in addition to their optical attractant.

In general, odoriferous attractants are expendable in a reasonably short period of time in contradistinction from light-type optical attractants that remain operative for relatively long periods of time. Because of this expendability, the olfactory attractants must commonly be periodically replaced and this requires structure to be provided to allow replacement. Such structure requires modification of an insect traditional structure of a bug electrocuting device and the addition of ancillary elements. The problem is exacerbated by the reasonably electrical high voltage such devices require and also by the requirement that an olfactory attractant generally be medially positioned in the structure so that it might be most efficiently distributed to most effectively attract insects from all directions to the appropriate killing area.

Our invention is distinguished from the prior art in providing such ancillary structure for olfactory attractant that fulfills these requirements. We provide a cup-like container, in the medial portion of the bottom of a traditional insect electrocuting device, that is mechanically biased to an inward operative position but manually movable against its bias to a position spacedly below the bottom of the structure to allow filling, replacement and maintenance procedures. The attractant container has associated switching means that upon moving the container downwardly from the bottom deactivate the electrical circuitry servicing the device to prevent any accidental contact by an operator with any active electrical components that might cause harm. The nature and structure of the attractant container allows use of all common olfactory attractants heretofore used, be they food stuffs, pheromones, odoriferous chemical materials or other materials.

Our invention is further distinguished from the prior art in providing a bottom structure that not only permits the support of an attractant cup, but also provides ancillary features to both aid attractant dispersement and insect entry into the electrocution chamber thereabove. Our structure provides a solid medial portion surrounded by an annular section spacedly adjacent its periphery defining a plurality of orifices. These orifices allow the upward flow of a selectively predetermined amount of air from the ambient atmosphere to aid dispersement of olfactory attractants carried in the attractant cup. This upward flow is aided by thermal convection induced by heat generated by the light source in the device, and attractant dispersement is enhanced by a solid top structure which prevents the attractant from moving vertically upwardly through the top of the device. The bottom orifices also provide a secondary benefit in that some insects, such as those of the wasp or yellow jacket family, prefer to approach food or enter orifices from a lower position and in an ascending course of travel. These insects will more readily enter a trap having bottom orifices than one having only vertical side orifices or top orifices to enhance the viability of our trap for this insect group.

Our invention also allows the use of all of the various structures and amenities heretofore commonly associated with electrocution type insect traps without interfering with their functions or purposes while yet providing its additional benefits.

Our invention resides not in any one of these features per se, but rather in the synergistic combination of all of the structures of our invention that give rise to the functions necessarily flowing therefrom as hereinafter further specified and claimed.

SUMMARY OF INVENTION

Our invention provides an improvement to existing insect electrocution devices having a peripherally defined protective container with top and bottom elements interconnected by a cylindrical element defining orifices to allow insect passage over a substantial portion of its area. The container encloses two spaced concentrically related cylindrical grids of mesh-like construction defining a plurality of orifices constituting a substantial portion of the areal surface of the grids. A light source is provided in the medial portion of the inner grid for viewing through the container and both grids. Electrical circuitry provides opposite electrical charges to the grids to electrocute insects intruding thereon or therebetween and powers the light source.

Our invention provides a container base element having a medial, vertically movable cup mechanically biased to an upward position within the base structure but movable by manual manipulation a spaced distance downwardly therefrom for access. An annular portion of the bottom structure surrounding the attractant cup defines orifices to aid insect entry and dispersement of gaseous attractant respectively. An associated switch disconnects power to the device responsive to opening of the attractant up to avoid operator injury. Olfactory attractants carried within the cup include odoriferous food stuffs, materials simulating the odors thereof and pheromones.

The structure of the top of the container is solid to aid suspension from a vertical support and dispersement of attractant.

In providing such a device, it is:

A principal object of our invention to create an improvement for traditional bug electrocuting devices that allows use of the traditional optical attractant and in addition, provides a novel accessible cup structure to carry and allow access to olfactory attractants.

A further object of our invention to provide such a cup structure that is carried in the medial portion of the bottom of a protective container for the electrocuting device so that a plurality of orifices may be defined in an annular spaced pattern in the bottom about the cup structure for insect access and airflow to aid dispersement of attractant vapors.

A still further object of our invention to provide such structure that has an electrical switch associated with the attractant cut, to shut off electrical power to the device responsive to attractant cup opening, for protection of an operator.

A still further object of our invention to provide such a structure that is of new and novel design, of rugged and durable nature, of simple and economic manufacture and otherwise well suited to the uses and purposes for which it is intended.

Other and further objects of our invention will appear from the following specification and accompanying drawings which form a part thereof. In carrying out the objects of our invention, however, it is to be understood that its features are susceptible to change in design and structural arrangement with only one preferred and practical embodiment being illustrated in the accompanying drawings, as is required.

BRIEF DESCRIPTION OF DRAWINGS

In the accompanying drawings which form a part hereof and wherein like numbers of reference refer to similar parts throughout:

FIG. 1 is an upward looking isometric view of our improvements in place in a typical insect electrocuting device, showing the improvement parts, their configuration and relationship.

FIG. 2 is an orthographic cross-sectional view of the device of FIG. 1, taken on the line 2—2 thereon in the direction indicated by arrows.

FIG. 3 is a partial orthographic side or elevation view of the internal light and switch structure of the device of FIG. 1, with the protective container and electrical grids removed for clarity of illustration.

FIG. 4 is a somewhat enlarged isometric view of the same internal structure as that illustrated in FIG. 3.

FIG. 5 is an orthographic side view of the structure of FIG. 4, showing particularly the operation of the attractant cup and associated switch structure.

FIG. 6 is a semi-diagrammatic illustration of the electric circuitry of a typical insect electrocuting device showing the switch of my invention incorporated therein.

DESCRIPTION OF THE PREFERRED EMBODIMENT

Our invention generally provides improved attractant cup structure 12 and associated base structure for an insect electrocuting device having cylindrical protective cover 10 carrying electrical apparatus 11 including an electrocuting grid structure and attractant light.

Protective cover 10 provides a cylindrical body formed by intersecting vertical rods 13 and cross elements 14 interconnected at their intersections to define a unitary mesh-like structure. The cross elements 14 may be angulated, as illustrated, or may extend perpendicularly to rods 13, but in either case the mesh should define a structure having a substantial portion of its area defining orifices. The size of the orifices so defined are such as to allow the free passage of flying insects to be exterminated, but yet small enough to prevent accidental access to the interior of the cover by humans, birds or domestic animals. This orifice size generally is in the range of a major dimension approximating 0.375 inch. Neither the physical dimension nor configuration of the body element are particularly critical to the use of our improvement and the standards for those features heretofore developed in the art are generally adaptable for use with our invention. Generally, the protective cover body will be formed as a cylinder and will have both a diameter and height, measured in an axial direction, of approximately ten to twelve inches.

The protective cover top is defined by a medial domed portion 15 structurally carrying a horizontally extending rim 16 which commonly extends a short distance beyond the cover body. The medial portion of the upper surface of dome 15 carries upwardly extending ring 17 to aid fastening of the device to a support thereabove. The space beneath dome 15 commonly carries electrical apparatus necessary to operate the device. The cover is formed of rigid material to the shape indicated and provides some means for structural interconnection to the protective cover body. This interconnection may be permanent or releasable, as desired, and various traps of both configurations have become known. Whatever the nature of the interconnection of the cover with the body, it must be such as to provide sufficient strength as to support the device when it be suspended by fastening ring 17.

The bottom of the protective cover provides cylindrical depending portion inner 18 structurally interconnecting medial annular portion 19 which in turn supports peripheral porch-like rim 20. Preferably rim 20 extends a spaced distance radially outwardly from body member 13, 14 to provide a porch or ledge where insects may alight and rest to inspect the various trap attractants prior to acceptance of their enticements. The depending inner portion 18 of the bottom defines medial attractant cup hole 25 to slidably receive cylindrical side 23 of the attractant cup. The annular medial portion 19 of the bottom defines plural spaced orifices 21, in the instance illustrated of optional oblong shape. These orifices generally should constitute at least half of the area of medial annular portion 19 and that medial annular portion should constitute at least half of the area of the bottom element. The size and configuration of orifices 21 is not essential to our invention, but should be such as to allow insect entry through the orifices should insects desire to enter in this fashion, and normally that requires an orifice of at least about 0.375 inch minimum dimension.

Attractant cup structure 12 provides a cylindrical cup peripherally defined by bottom 22 structurally communicating with vertical cylindrical side 23. Bottom 22 on its under surface carries depending ring 24 to aid manual manipulation of the cup. Bottom 22 is somewhat larger in diameter than cylindrical side 23 to leave lip 25 projecting radially outwardly from that cylindrical side to serve as a stop to prevent the cup from moving upwardly beyond the bottom element. Bottom 22 normally, but not necessarily, will constitute a mesh-like member illustrated to allow passage of upwardly moving air through the bottom and into the medial portion of the device. The bottom 22 may be of a solid nature, if necessary for proper and appropriate containment of attractant materials or the dispersement or life span of such materials.

A bridge element comprising vertical posts 26 with horizontal beam 27 extending therebetween is carried on the upwardly facing inner surface of the cylindrical depending inner portion 18 of the bottom element. The bridge is positioned over cup hole 25 so that beam 27 is spacedly above the innermost position of cylindrical side 23 of attractant cup 12. Paired opposed extension springs 29 communicate from the upper portion of vertical bridge post elements 26 to the upper peripheral surface of cylindrical side 23 of the attractant cup to bias that cup to an upward position relative to the depending inner portion 18 of the bottom element of the protective cover.

Upward extending switch post 29 is carried by cylindrical side 23 of the attractant cup inwardly adjacent its inner surface. This post in its upper portion supports horizontally extending switch finger 30 to communicate with sensing arm 31 of position sensing switch 32 which is carried by horizontal beam 27 of the bridge structure. The bridge 26, 27 is preferably formed of channel members, as illustrated, or at least the horizontal beam portion thereof is so formed to allow the channel defined by that beam to support the lower portion of a traditional "U" shaped light tube 33 that is commonly used in insect electrocution devices as an optical attractant.

Electrical apparatus 11 of our invention is seen in the diagrammatic illustration of FIG. 6. Household current of the 110 volt single phase type passes from outlet plug 38 in series with switch 32 and primary coil 34 of a transformer. The voltage is raised by induction through secondary coil 35 of the transformer and passed in parallel to "U" shaped glow tube 36 and concentric spaced cylindrical grids 37 and 38. The charge created between outer grid 36 and inner grid 37 is such that when an insect comes into the dielectric space between the two grids its body is sufficient to cause a discharge between those grids to electrocute the insect according to principles heretofore known in the prior art dealing with such devices. These electrical structures and this circuitry are not novel, per se, have heretofore become known and are therefore not described in detail as they do not constitute a direct part of our invention, per se, but rather only constitute necessary associative apparatus and structure that is required for the operation and function of our invention.

The various structures of our invention per se are formed from some reasonably rigid, durable material that preferably has a high dielectric constant to provide additional safety for the device in preventing its malfunctioning and damage to an operator by reason of an abnormal electrical functioning or condition. The construction material of preference is one of the polymeric plastics of the modern day commerce, many of which well fulfill the purposes of our invention. This material may be colored, if desired, to add an additional optically attracting feature, as it has heretofore become known that particular colors, especially those ranging from a yellow to a yellowish green in the light spectrum, are particularly attractive to insects and if used for the structure of our device, may increase its efficiency in attracting insects.

The attractants for use with our invention are those commonly used in the past for attracting flying insects. The most common attractants are odoriferous food stuffs of one sort or another or chemical substances, especially of the pheromone type, or those simulating the odor of particular food stuffs, such as meat or one of the butyric acid derivatives for wasps or yellow jackets; yeast, eggs, milk or a fermenting combination of them for flies; and the like. These substances may generally be placed in the attractant cup in their normally existing form or admixed with some type of carrier, such as an absorbent pad which may be carried in the cup. The attractants, per se, and their method of placement and dispersement, however, are not a direct part of our invention and the commonly known and used attractants of the prior art are operative as are their known methods of dispersement.

Having described the structure of our invention, its operation may be understood.

Firstly, a device is constructed according to the foregoing specification and thereafter disposed in an appropriate position for use and provided with electric current. The attractant cup 12 is opened by manually pulling it downwardly until its upper portion is sufficiently below the element 28 and an olfactory attractant material is established in the cup by appropriate manipulation. The cup is then allowed to move inwardly in hole 25 until it is in its inwardmost position with its bottom rim immediately adjacent the lower surface of element 28. The trap is then ready for operation.

The light source during hours of darkness provides an attractant for many insects at some substantial distance from the device. The olfactory attractant operates at any time, but is most useful during daylight hours, as insects tend to feed at that time and the optical attractant is then least useful. The ambient atmosphere will enter the trap and move upwardly through it to cause dispersement of vaporous olfactory attractants therefrom. The air motion is induced and enhanced by heat generated from within the device by the electrical apparatus, as air warmed by that apparatus will be less dense and tend to move upwardly to cause other cooler air to flow inwardly to create an airflow pattern which tends to move vaporized attractant from the attractant source to the surrounding atmosphere. These attractant vapors in general will move upwardly, but will be stopped in their upward course of motion by solid top element 15, 16. As the vaporous attractant contacts that element, it will tend to disperse laterally outwardly therefrom. The optical and olfactory attractant will attract insects in the vicinity of the electrocution device and as those insects come into the vicinity of the device, the attractant will be most concentrated in the medial portion of the structure. Insects by their instincts will move to the area of greatest attractant concentration and will tend to enter the device through protective cover 10 and into the grid structure.

This insect entry may be accomplished directly by flying or some insects may approach the structure, inspect it, light upon it and thereafter enter it in more cautious fashion either by flying or crawling. In either event, the insects ultimately will be drawn toward the interior of the device as the attractants are most concentrated in that area. As this occurs, the insects must pass through and between the two charged cylindrical grids and as they do so, the presence of their bodies on or between the two grids will be sufficient to cause an electrical discharge between the grids and through the insect's body to kill the insect by electrocution. As the insect is electrocuted, it will tend to fall downwardly out of the area between the two charged girds by reason of gravity and the current flow between the grids will cease when the air dielectric is re-established, all to make an automatic action cycle for the trap.

As the olfactory attractant is expended, it may be replenished in the same fashion as that in which it was initially placed for use in our structure.

As the attractant cup is opened, current supplied to the device will be shut off by switch 32. This switch is a position-sensitive switch maintained in a normally closed position when switch arm 32 is in an upward position whereat it is maintained by reaction with switch arm 32 when attractant cup 12 is in its biased inward position. As the cup is moved downwardly, switch arm 32 is allowed to move to its biased opened position to deactivate the current flow to the device to stop its operation and render it harmless to an operator servicing the attractant cup. As the attractant cup structure is moved to its inward operative position, switch 32 is again closed and current again flows in the device to re-establish its normal electrical operation.

The foregoing description of our invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described our invention, what we desire to protect by Letters Patent, and what we claim is:

1. In a device to destroy insects by electrocution having a protective cover with a cylindrical body defining a plurality of orifices, a solid top closing its upper portion, and bottom structure closing its lower portion with concentric spaced cylindrical grids spacedly carried therein, each electrically isolated from the other, and an optical attractant carried within the inner electrical grid, the invention comprising a bottom structure including:

a depending inner portion defining a hole slidably carrying a vertically movable attractant cup spring biased to an upper position but movable a spaced distance below said medial body portion for servicing, and an annular portion about the depending inner portion defining a plurality of spaced orifices.

2. The invention of claim 1 further characterized by the attractant cup having mechanical means to operate an electrical switch to pass electrical current to the device only when the attractant cup is in its upward biased position.

3. In a device for exterminating flying insects, of the type having concentric spaced electrical grids surrounding a light source and being surrounded by a protective cover having a body portion with a plurality of orifices, a closed top portion and the bottom portion, the invention comprising:

the inner part of the bottom portion defining a hole slidably carrying an attractant cup for limited vertical motion with a bridge structure, carried by the upper surface of the bottom spacedly above the orifice defined therein, carrying extension spring means to bias the cup to an inward position, the attractant cup having means to prevent its lower portion from moving upwardly through the hole carrying it and having an upwardly extending switch post to operatively contact a position-sensitive switch carried on the bridge structure to close that switch from its normally opened biased position only when the attractant cup is in its inward biased position.

4. The invention of claim 3 further characterized by the bottom structure defining a medial annular area about the inner portion defining the attractant cup orifice, said medial annular portion defining a plurality of spaced orifices sized to allow insect ingress therethrough through the protective cover.

* * * * *